United States Patent
High et al.

(10) Patent No.: US 10,538,327 B2
(45) Date of Patent: Jan. 21, 2020

(54) SYSTEMS AND METHODS FOR TRANSPORTING PRODUCTS VIA UNMANNED AERIAL VEHICLES

(71) Applicant: Walmart Apollo, LLC, Bentonville, AR (US)

(72) Inventors: Donald R. High, Noel, MO (US); Nathan G. Jones, Bentonville, AR (US); Gregory A. Hicks, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 302 days.

(21) Appl. No.: 15/584,322

(22) Filed: May 2, 2017

(65) Prior Publication Data

US 2017/0320572 A1 Nov. 9, 2017

Related U.S. Application Data

(60) Provisional application No. 62/331,854, filed on May 4, 2016.

(51) Int. Cl.
*B64C 39/02* (2006.01)
*G05D 1/00* (2006.01)
(Continued)

(52) U.S. Cl.
CPC ............ *B64C 39/024* (2013.01); *B64D 1/02* (2013.01); *G05D 1/0011* (2013.01);
(Continued)

(58) Field of Classification Search
CPC .................................................. B64D 2201/12
(Continued)

(56) References Cited

U.S. PATENT DOCUMENTS 3,053,480 A * 9/1962 Vanderlip ............... B64C 27/54
244/17.13
4,553,719 A * 11/1985 Ott .......................... B64D 9/00
244/118.1
(Continued)

FOREIGN PATENT DOCUMENTS

CN 103778523 5/2014
CN 204759206 11/2015
(Continued)

OTHER PUBLICATIONS

Russon, Mary-Ann; "Pie in the sky: How Russion Firm DoDo Pizza Delivers Takeaways by Drone"; http://www.ibtimes.co.uk/dronedeliveryrussiasairbornepizzasareheightfinedining1454684; Jun. 30, 2014; 2 pages.

(Continued)

*Primary Examiner* — Bret Hayes
(74) *Attorney, Agent, or Firm* — Fitch, Even, Tabin and Flannery LLP

(57) ABSTRACT

In some embodiments, methods and systems of facilitating movement of product-containing pallets include at least one forklift unit configured to lift and move the product-containing pallets, at least one motorized transport unit configured to mechanically engage and disengage a respective forklift unit, and a central computer system in communication with the at least one motorized transport unit. The central computer system is configured to transmit at least one signal to the at least one motorized transport unit. The signal is configured to cause the at least one motorized transport unit to control the at least one forklift unit to move at least one of the product-containing pallets.

18 Claims, 6 Drawing Sheets

(51) Int. Cl.
*B64D 1/02* (2006.01)
*G06Q 10/08* (2012.01)

(52) U.S. Cl.
CPC .... *G06Q 10/0832* (2013.01); *B64C 2201/128* (2013.01); *B64C 2201/145* (2013.01)

(58) Field of Classification Search
USPC .................................. 244/17.1, 118.1, 137.4
See application file for complete search history.

(56) References Cited

U.S. PATENT DOCUMENTS

| | | | |
|---|---|---|---|
| 4,826,109 A | * | 5/1989 | Camus ................. B64D 1/22 |
| | | | 244/137.4 |
| 7,059,566 B2 | | 6/2006 | Byers |
| 9,550,577 B1 | | 1/2017 | Beckman |
| 9,573,684 B2 | | 2/2017 | Kimchi |
| 2011/0084162 A1 | | 4/2011 | Goossen |
| 2014/0032034 A1 | | 1/2014 | Raptopoulos |
| 2015/0120094 A1 | | 4/2015 | Kimchi |
| 2015/0175276 A1 | * | 6/2015 | Koster ................. B64F 1/32 |
| | | | 244/114 R |
| 2015/0183528 A1 | | 7/2015 | Walsh |
| 2015/0203200 A1 | | 7/2015 | Bye |
| 2015/0277440 A1 | | 10/2015 | Kimchi |
| 2016/0016664 A1 | | 1/2016 | Basuni |
| 2016/0196755 A1 | | 7/2016 | Navot |
| 2016/0257401 A1 | | 9/2016 | Buchmueller |
| 2017/0081043 A1 | * | 3/2017 | Jones ................. B64C 37/02 |
| 2017/0110017 A1 | | 4/2017 | Kimchi |
| 2017/0203843 A1 | * | 7/2017 | Chan ................. B64C 39/024 |
| 2017/0313421 A1 | * | 11/2017 | Gil ................. H04W 4/70 |

FOREIGN PATENT DOCUMENTS

| | | |
|---|---|---|
| WO | 2014080386 | 5/2014 |
| WO | 2014080390 | 5/2014 |

OTHER PUBLICATIONS

International Search Report and Written Opinion dated Jul. 19, 2017; in corresponding PCT App. No. PCT/US2017/030506.

* cited by examiner

US 10,538,327 B2

SYSTEMS AND METHODS FOR TRANSPORTING PRODUCTS VIA UNMANNED AERIAL VEHICLES

CROSS-REFERENCE TO RELATED APPLICATION

This application claims the benefit of U.S. Provisional Application No. 62/331,854, filed May 4, 2016, which is incorporated herein by reference in its entirety.

TECHNICAL FIELD

This disclosure relates generally to transporting products and, in particular, to systems and methods for transporting products via unmanned aerial vehicles.

BACKGROUND

Product transportation and delivery using unmanned aerial vehicles (UAVs) is becoming popular. For safety purposes, the total weight of a UAV has been limited by the federal aviation administration to 55 pounds including the weight of the UAV's payload.

It is not uncommon for consumers to place product orders such that the total weight of the products in an order, together with the weight of a UAV, would exceed 55 pounds. In such situations, UAV operators (e.g., delivery drivers) have to manually load a UAV multiple times to effectuate a multi-step delivery of the products in an order to the customer. Such manual multi-step loading of a UAV to effectuate a single delivery to a single customer is inefficient and costly, wasting valuable time for a product delivery operator. Also, the customer would be expected to manually unload the UAV multiple times after each drop off by the UAV of a portion of a delivery, possibly exposing the customer to the moving propellers of the UAV, which is undesirable.

BRIEF DESCRIPTION OF THE DRAWINGS

Disclosed herein are embodiments of systems, devices, and methods pertaining to methods and systems for transporting product-containing packages via unmanned aerial vehicles. This description includes drawings, wherein.

Figure 1:
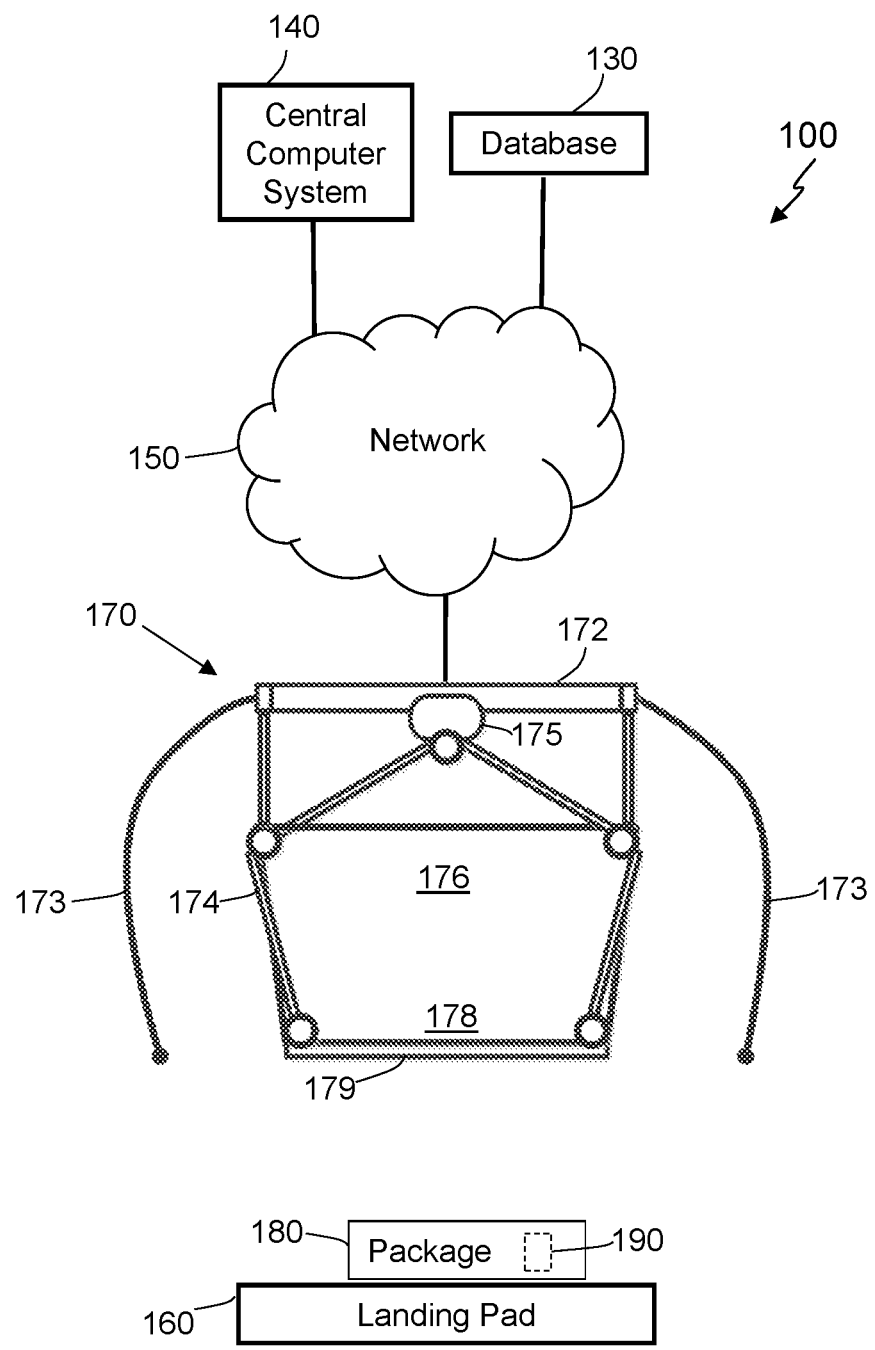
FIG. 1 is a diagram of a system for transporting product-containing packages via UAVs in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein provide for transporting products via unmanned aerial vehicles.

In one embodiment, an unmanned aerial system for transporting at least one product includes: an unmanned aerial vehicle including a body, a processor-based control circuit coupled to the body, and a receptacle coupled to the body. The receptacle includes: an interior configured to retain the at least one product and having an opening configured to permit the at least one product to pass therethrough; and a cover movable from a first position, where the cover covers at least a portion of the opening to restrict the at least one product from passing through the opening, to a second position, where the cover does not cover at least a portion of the opening to permit the at least one product to pass through the opening.

In another embodiment, a method of transporting at least one product via an unmanned aerial system includes: providing an unmanned aerial vehicle including a body, a processor-based control circuit coupled to the body, and a receptacle coupled to the body. The receptacle including an interior configured to retain the at least one product and having an opening configured to permit the at least one product to pass therethrough and a cover. The method further includes moving the cover from a first position, where the cover covers at least a portion of the opening to restrict the at least one product from passing through the opening, to a second position, where the cover does not cover at least a portion of the opening to permit the at least one product to pass through the opening.

FIG. 1 shows an embodiment of a system 100 for transporting at least one package 180 containing one or more products 190. It will be understood that the details of this example are intended to serve in an illustrative capacity and are not necessarily intended to suggest any limitations in regards to the present teachings. Generally, as shown in FIG. 1, the exemplary system 100 includes at least one unmanned aerial vehicle (UAV) 170 configured to lift, transport, and drop off at least one package 180 that contains at least one product 190, as well as at least one landing pad 160 configured to support the package 180 and to permit the UAV 170 to land thereon to pick up and/or to drop off the package 180. The system 100 also includes a processor-based central computer system 140 in two-way communication with the UAV 170 and/or the landing pad 160, a database 130, and a network 150. It is understood that more or fewer of such components may be included in different embodiments of the system 100.

While the present application refers to a package 180 in the context of the object being transported by the UAV 170, it will be appreciated that the principles described herein are applicable to any object other than a package 180 that may contain a product 190 and may be transported by the UAV 170, including but not limited to boxes, totes, bins, unpackaged products 190, or the like. In addition, it will be understood that the product 190 transported by the UAV 170 may be any product that may be ordered by a consumer from a retailer. The package 180 containing the product 190 may be transported from a facility of a retailer to a delivery address associated with a customer, or between two or more facilities of the retailer. Generally, the UAV 170 is configured to fly above ground through a space, to land onto a landing pad 160, to pick up the package 180 from the landing pad 160, and to take off from the landing pad 160 after having picked up the package 180, as described in more detail below.

The UAVs 170 deployed in the exemplary system 100 do not require physical operation by a human operator and wirelessly communicate with, and are wholly or largely controlled by, the central computer system 140. In particular, in some embodiments, the central computer system 140 is configured to control movement (e.g., flying, landing, taking off, etc.) of the UAVs 170 based on a variety of inputs. For example, the central computer system 140 communicates with each UAV 170 via the network 150, which may be one or more wireless networks of one or more wireless network types (such as, a wireless local area network (WLAN), a wireless personal area network (PAN), a wireless mesh network, a wireless star network, a wireless wide area network (WAN), a local area network (LAN), a cellular network, and combinations of such networks, and so on), capable of providing wireless coverage of the desired range of the UAVs 170 according to any known wireless protocols, including but not limited to a cellular, Wi-Fi, Zigbee or Bluetooth network.

In the exemplary system 100 of FIG. 1, the central computer system 140 is in two-way communication with the UAVs 170 via the network 150. In some embodiments, as will be described below, the central computer system 140 is configured to transmit at least one signal to one or more UAVs 170 to cause the UAVs 170 to fly toward and land onto or take off from one or more landing pads 160 in order to transport, pick up, and/or drop off one or more packages 180 that contain one or more products 190. The central computer system 140 of the exemplary system 100 of FIG. 1 may be a stationary or portable electronic device, for example, a desktop computer, a laptop computer, a tablet, a mobile phone, or any other electronic device. In some embodiments, the central computer system 140 may comprise a control circuit, a central processing unit, a processor, a microprocessor, and the like and may be one or more of a server, a central computing system, a retail computer system, a cloud-based computer system, and the like. In the embodiment of FIG. 1, the central computer system 140 is configured for data entry and processing as well as for communication with other devices (e.g., UAVs 170) of system 100 via the network 150.

Generally, the central computer system 140 may be any processor-based device configured to communicate with the UAVs 170 based on delivery orders. The central computer system 140 may include a processor configured to execute computer readable instructions stored on a computer readable storage memory. The central computer system 140 may generally be configured to cause the UAV 170 to travel to a delivery location, locate the landing pad 160, release the package 180 onto the landing pad 160, and/or to pick up the package 180 from the landing pad 160. In some embodiments, the central computer system 140 may be configured to determine whether one or more landing and/or pick/up and/or drop off conditions for the UAV 170 are met prior to instructing the landing of the UAV 170 onto the landing pad 160.

Figure 2:
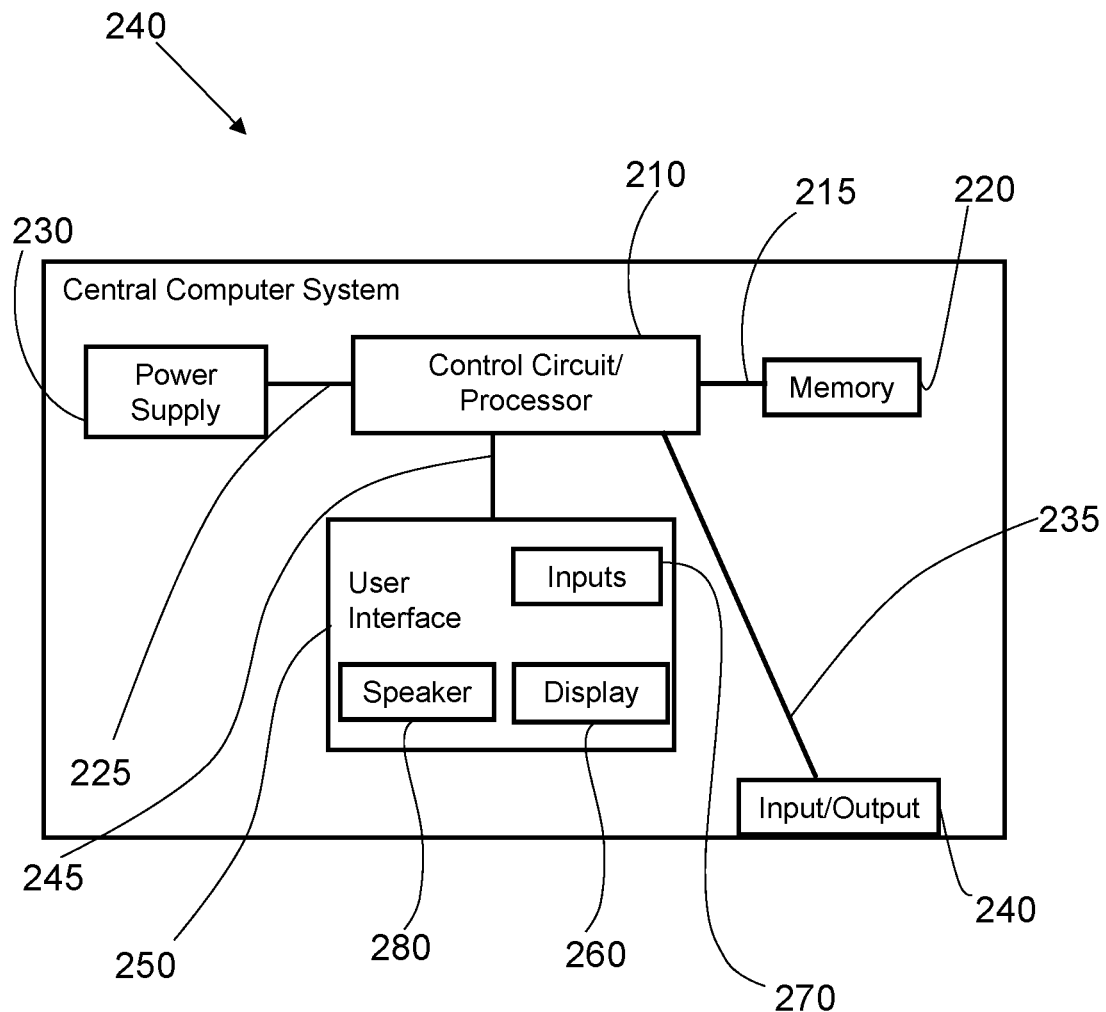
FIG. 2 is a functional block diagram of a central computer system in accordance with some embodiments.

With reference to FIG. 2, the central computer system 140 configured for use with exemplary systems and methods described herein may include a control circuit 210 including a processor (e.g., a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the central computer system 140 is also electrically coupled via a connection 235 to an input/output 240 (e.g., wireless interface) that can receive wired or wireless signals from one or more of the UAVs 170. Also, the input/output 240 of the central computer system 140 can send signals to the UAVs 170, such as signals including instructions indicating which package 180 to pick up from which landing pad 160, where to transport the package 180 via the UAV 170, and where to drop off the package 180 via the UAV 170.

In the embodiment shown in FIG. 2, the processor-based control unit 210 of the central computer system 140 is electrically coupled via a connection 245 to a user interface 250, which may include a visual display or display screen 260 (e.g., LED screen) and/or button input 270 that provide the user interface 250 with the ability to permit an operator, such as a worker at the product storage facility 110 where the system 100 is implemented, of the central computer system 140 to manually control the central computer system 140 by inputting commands via touch-screen and/or button operation and/or voice commands to, for example, to send a signal to a UAV 170 to instruct the UAV 170 to: fly to a location of a landing pad 160; control movement of the UAV 170 while the UAV 170 is in flight; control and/or modify the flight route of the UAV while the UAV 170 is in flight; hover above the landing pad 160; land onto the landing pad 160; lift off the landing pad 160. It will be appreciated that the performance of such functions by the processor-based control unit 210 of the central computer system 140 is not dependent on actions of a human operator, and that the control unit 210 may be programmed to perform such functions without being actively controlled by a human operator.

In some embodiments, the display screen 260 of the central computer system 140 is configured to display various graphical interface-based menus, options, and/or alerts that may be transmitted from and/or to the central computer system 140 in connection with various aspects of transporting packages 180 by the UAVs 170. The inputs 270 of the central computer system 140 may be configured to permit an operator to navigate through the on-screen menus on the central computer system 140 and make changes and/or updates to the routes and destinations of the UAVs 170. It will be appreciated that the display screen 260 may be configured as both a display screen and an input 270 (e.g., a touch-screen that permits an operator to press on the display screen 260 to enter text and/or execute commands.)

In some embodiments, the inputs 270 of the user interface 250 of the central computer system 140 may permit users (e.g. via a web page, mobile application, etc.) to enter and configure a delivery and/or pick up order for a UAV 170. For example, a user may use the user interface 250 to identify a delivery destination and/or pick up destination for a UAV in order to drop off and/or pick up a package 180. The central computer system 140 may further associate a customer account and/or an identifier of a landing pad 160 (e.g., in the database 130) with each delivery order assigned to a UAV 170.

In some embodiments, the central computer system 140 automatically generates a travel route for one or more of the UAVs 170 from their origin to their destination. In some embodiments, this route is based on a starting location of a UAV 170 (e.g., location of landing pad 160 of origin), the intended destination of the UAV 170 (e.g., location of the destination landing pad 160). The central computer system 140 may calculate multiple possible optimum routes. In some embodiments, the system 100 is capable of integrating 2D and 3D maps of the navigable space of the UAVs 170 with physical locations of objects at the origin/destination locations. Once the central computer system 140 maps all objects to specific locations using algorithms, measurements and global position system (GPS) geo-location, for example, grids may be applied sectioning off the maps into access ways and blocked sections, enabling the UAVs 170 to use such grids for navigation and recognition. The grids may be applied to 2D horizontal maps along with 3D models. Such grids may start at a higher unit level and then can be broken down into smaller units of measure by the central computer system 140 when needed to provide more accuracy.

In the embodiment shown in FIG. 1, the central computer system 140 is configured to access at least one electronic database 130. The central computer system 140 and the database 130 may be implemented as separate physical devices as shown in FIG. 1 (which may be at one physical location or two separate physical locations), or may be implemented as a single device. In some embodiments, the database 130 may be stored, for example, on non-volatile storage media (e.g., a hard drive, flash drive, or removable optical disk) internal or external to the central computer system 140, or internal or external to computing devices distinct from the central computer system 140. In some embodiments, the database 130 is cloud-based.

The exemplary database 130 of FIG. 1 is configured to store electronic data including, but not limited to: data associated with the products 190 (e.g., location of origin of a product 190, destination of the product 190, size of the product 190, location of the product 190 (while on a landing pad 160 or while being transported by a UAV 170), storage requirements for the product 190, special instructions for the product 190, etc.); data associated with the packages 180 being used to store the products 190 (e.g., location of a package 180 (while on a landing pad 160 or when being transported by a UAV 170), orientation of the package 180 at the pick-up location (e.g., landing pad 160), size of the package 180, weight of the package 180, destination of the package 180, identification of products 190 on the package 180, etc.); and data associated with the UAVs 170 being used to transport the packages 180 (e.g., location of each UAV 170 (e.g., GPS coordinates, etc.), identification of one or more packages 180 in the UAV 170, route of the UAV 170 from the pick-up of a package 180 (e.g., from a landing pad 160) to the drop off of the package 180 (e.g., at a landing pad 160), communication signals and/or messages sent from the central computer system 140 to the UAVs 170, any communications (e.g., messages and/or alerts) sent between the UAVs 170 and/or between the UAVs 170 and the landing pads 160).

In some embodiments, location inputs are provided via the network 150 to the central computer system 140 to enable the central computer system 140 to determine the location of one or more of the UAVs 170 and/or one or more packages 180 and/or products 190. For example, in some embodiments, the UAVs 170 and/or the packages 180 and/or the products 190 may include GPS tracking devices that permit a GPS-based identification of the location of the UAVs 170 and/or the packages 180 and/or the products 190 by the central computer system 140.

Generally, the UAV 170 of FIG. 1 is configured to transport a package 180 from a dispatch or origin location to a delivery location. While the UAVs 170 are generally described herein, in some embodiments, a piloted aerial vehicle may be utilized with the systems and methods described herein without departing from the spirit of the present disclosure. In some embodiments, the UAV 170 may be in the form of a multicopter configured to hover over a landing pad 160. In some embodiments, the UAV 170 may be a quadcopter, or hexacopter, octocopter, etc. In some embodiments, as described below, the UAV 170 includes a communication device (e.g., wireless transceiver) configured to communicate with the central computer system 140 during flight and while landed on a landing pad 160; a GPS receiver configured to provide geolocation information of the UAV 170 to the central computer system 140; and a control circuit configured to control the motors driving a plurality of propellers to steer the UAV 170.

In some embodiments, as described in more detail below, the UAV 170 may comprise one or more landing pad-associated sensors including but not limited to: an optical sensor, a camera, an RFID scanner, a short range radio frequency transceiver, etc. Generally, the receiving pad-associated sensors are configured to detect and/or identify a landing pad 160 based on guidance systems and/or identifiers of the landing pad 160. For example, the landing pad-associated sensor of the UAV 170 may be configured to capture identifying information of a landing pad 160 from one or more of a visual identifier, an optically readable code, a radio frequency identification (RFID) tag, an optical beacon, and a radio frequency beacon. In some embodiments, the UAV 170 may include other flight sensors such as optical sensors and radars for detecting obstacles in the path of flight to avoid collisions. While only one UAV 170 is shown in FIG. 1, in some embodiments, the central computer system 140 may communicate with and/or provide instructions to a plurality of UAVs 170 simultaneously to transport packages 180 to a plurality of landing pads 160 and/or to pick up packages 180 from a plurality of landing pads 160.

FIG. 1 illustrates a UAV 170 according to some embodiments. It is noted that in other embodiments, the UAV 170 may have other shapes and/or configurations and is not limited to being disc-shaped. For example, the UAV may be cubic, octagonal, triangular, or other shapes, and may be dependent on the configuration of the landing pad 160 with which the UAV 170 is intended to cooperate. In the exemplary embodiment shown in FIG. 1, the UAV 170 includes a body 172, a processor-based control circuit (shown in FIG. 3) coupled to the body 172, and a package retaining receptacle 174 coupled to the body 172. The exemplary UAV 170 of FIG. 1 also includes support legs 173 extending from the body 172. The support legs 173 may be motorized or non-motorized. While two legs 173 are shown in FIG. 1, it will be appreciated that the UAV 170 may include three, four, five, six, eight, or more support legs 173, depending on the size and load-carrying capacity of the UAV 170. The support legs 173 may be made from rigid material (e.g., metal, plastic, or the like). In some embodiments, the receptacle 174 may be in the form of a net, a mesh, or the like made from a flexible material (e.g., polymeric material, fabric material, or the like) that extends around the support legs 173. In some embodiments, the receptacle 174 may be in the form of a basket, box, or the like enclosure made from a rigid material (e.g., metal, plastic, or the like) located between the support legs 173 as shown in FIG. 1.

Generally, the package-retaining receptacle 174 of the UAV 170 may be in the form of any structure that is sized and shaped to retain one or more packages 180. The exemplary receptacle 174 includes an interior 176 configured to retain one or more loose products 190 or product-containing packages 180. The interior 176 includes an opening 178 configured to permit one or more product-containing packages 180 to pass therethrough. The receptacle 174 of the exemplary UAV 170 includes a cover 179 movable from a first (closed) position (see, e.g., FIG. 4A), where the cover 179 covers at least a portion of the opening 178 to restrict a package 180 from passing through the opening 178, to a second (open) position (see, e.g., FIG. 4B), where the cover 179 does not cover at least a portion of the opening 178 to permit the product 180 to pass through the opening 178 into the interior 176 of the receptacle 174 (see, e.g., FIG. 4C).

In some embodiments, the UAV 170 may transport the package 180 via the package-retaining receptacle 174 coupled to an aerial crane 175 as shown in FIG. 1. It will be appreciated that the aerial crane 175 is optional and that the receptacle 174 may be coupled directly to the body 172 of the UAV 170. The aerial crane 175 may generally be a device configured to retain the receptacle 174 in place and/or to lower the receptacle 174 relative to the UAV 170 and/or to raise the receptacle 174 relative to a landing pad 160. For example, in some embodiments, the aerial crane 175 may comprise one or more extendable cables coupled to the receptacle 174 via, for example, one or more of a hook, a latch, a clamp, a clip, a magnet, etc. In some embodiments, the aerial crane 175 may be configured unwind the cable to lower the receptacle 174 toward the landing pad 160 while the UAV 170 maintains a hover altitude (e.g. 5-10 feet above the landing pad 160). In some embodiments, the aerial crane 175 may be configured to at least partially retract the cable into the housing of the aerial crane 175 before the UAV 170 takes off and flies away from the landing pad 160 over which the UAV 170 was hovering. In some embodiments, the aerial crane 175 may be controlled by a control circuit of the UAV 170. In some embodiments, the aerial crane 175 may comprise a separate control circuit activated by the central computer system 140 and/or a wireless transmitter on the landing pad 160.

The exemplary landing pad 160 of FIG. 1 is generally a device configured to provide support for packages 180 including one or more products 190 purchased and/or being returned by a customer and being delivered and/or picked up by the UAV 170. Generally, the landing pad 160 of the system 100 includes a support surface 162 configured to support at least one package 180 and at least one UAV 170 thereon, as shown, for example, in FIG. 4D. Generally, the package 180 may be positioned at or near the center of the landing pad 160, but it may be appreciated that the package 180 may be positioned anywhere on the support surface of the landing pad 160 suitable for pick up and/or drop off the of the package by the UAV 170.

In some embodiments, the support surface 162 of the landing pad 160 may comprise one or more of a padded layer and a foam layer configured to reduce the force of impact associated with the landing of a UAV 170 and/or with a drop of a package-containing receptacle 174 and/or the package 180 onto the support surface 162 of the landing pad 160. In some embodiments, the support surface 162 of the landing pad 160 may comprise a flexible and/or rollable material that may be rolled up and stored when the landing pad 160 is not in use. In some embodiments, the support surface 162 of the landing pad 160 comprises a surface that facilitates the cover 179 of the UAV 170 to pick up the package 180 from the support surface 162 of the landing pad 160. For example, in one aspect, the support surface 162 of the landing pad 160 is formed from a material that is slippery and/or otherwise has a reduced frictional coefficient to reduce the friction between the surface of the package 180 and the support surface 162 during the pick-up of the package 180 from the surface 162 of the landing pad 160 by the cover 179 of the UAV 170, thereby reducing the force required for the cover 170 to successfully pick up the package 180 from the surface 162 of the landing pad 160. In some aspects, the support surface 162 of the landing pad 160 includes one or more materials configured in the form of a carpet and/or artificial grass that creates a soft and/or wavy surface that facilitates the ease with which the cover 179 can slide under the package 180 and pick up the package 180 from the support surface 162 of the landing pad 160. In one aspect, the support surface 162 of the landing pad 160 includes a backing and synthetic (e.g., nylon, polypropylene, etc.) bristles extending from the backing such that the package 180 rests on the synthetic bristles and can be more easily picked up by the cover 179 of the UAV 170 because the bristles do not impede the movement of the cover 179 or the movement of the package 180 as it is being picked up by the cover 179. In some embodiments, the support surface 162 of the landing pad 160 comprises one or more folding creases for retracting the landing pad 160 when not in use. For example, the landing pad 160 may be coupled to a motorized retractor configured to retract and extend the landing pad 160. In some embodiments, the motorized retractor may be configured to automatically extend the landing pad 160 in response to a UAV 170 approaching the landing pad 160. In some embodiments, the approach of the UAV 170 may be detected based on a detecting a signal broadcasted by the UAV 170 (e.g. a wireless beacon). In some embodiments, the landing pad 160 may include lights and/or guidance inputs recognizable by the sensors of the UAV 170 when located in the vicinity of the landing pad 160. In some embodiments, the landing pad 160 may also include one or more coupling structures configured to permit the UAV 170 to detachably couple to the landing pad 160 during and/or after landing on the support surface 162 of the landing pad 160. Some exemplary landing pads usable with the system 100 are described in U.S. Provisional Application No. 62/318,675, filed Apr. 5, 2016, incorporated by reference herein in its entirety. It will be appreciated that the relative sizes and proportions of the landing pad 160, the package 180, and the UAV 170 in FIG. 1 are exemplary and are not drawn to scale. In some embodiments, the landing pad 160 and the package 180 may comprise any size and shape without departing from the spirit of the present disclosure.

Figure 3:
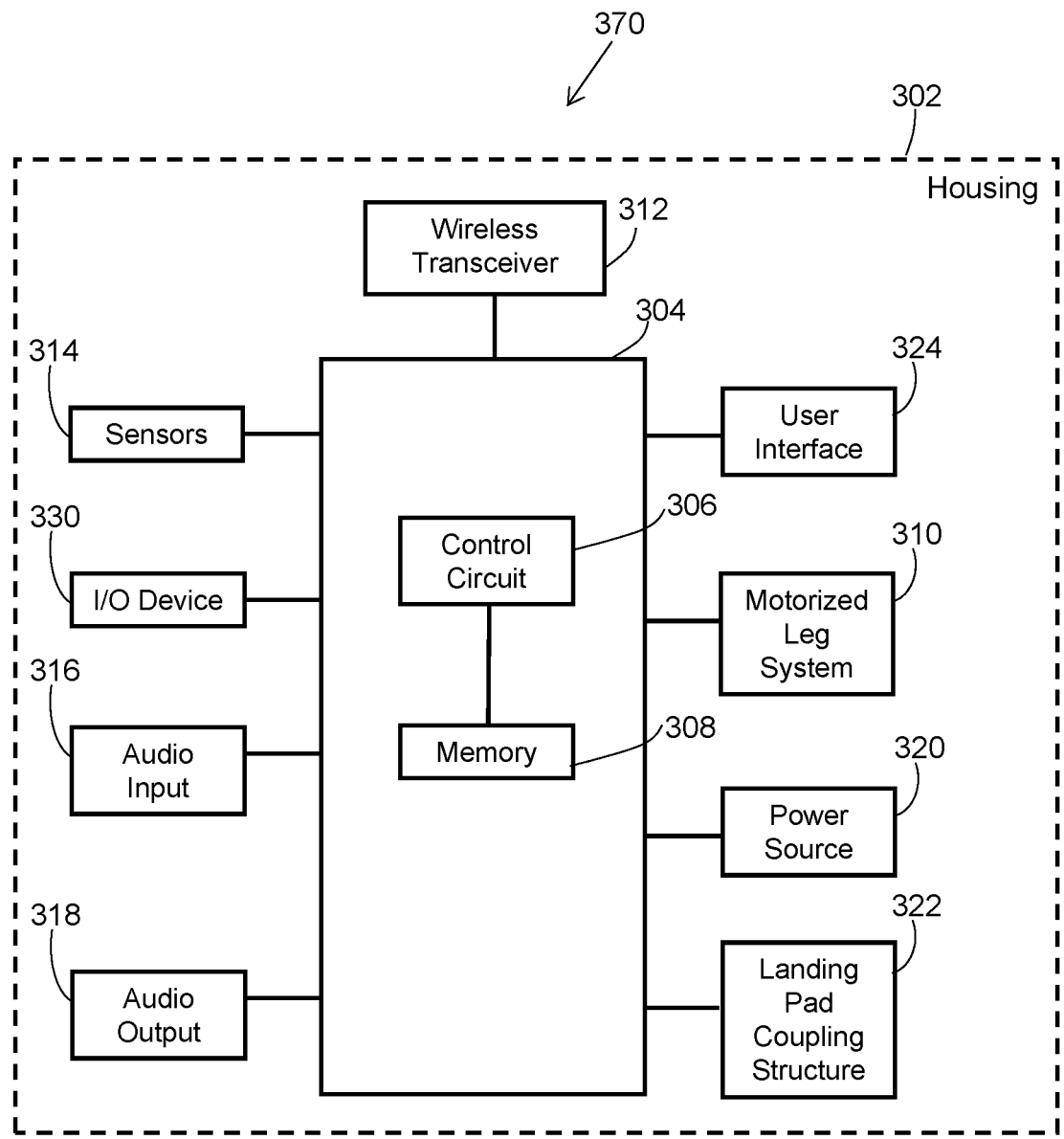
FIG. 3 comprises a block diagram of a UAV as configured in accordance with various embodiments of these teachings.

FIG. 3 presents a more detailed example of some embodiments of the UAV 170 of FIG. 1. In this example, the UAV 370 has a housing 302 that contains (partially or fully) or at least supports and carries a number of components. These components include a control unit 304 comprising a control circuit 306 that, like the control circuit 210 of the central computer system 140, controls the general operations of the UAV 370. The control unit 304 includes a memory 308 coupled to the control circuit 306 for storing data such as operating instructions and/or useful data.

In some embodiments, the control circuit 306 operably couples to a motorized leg system 310. This motorized leg system 310 functions as a locomotion system to permit the UAV 370 to land onto the landing pad 160 and/or move laterally on the landing pad 160. Generally, this motorized leg system 310 will include at least one support leg 173 (i.e., a mechanical leg that may move under power to cause the UAV 370 to move through interaction with, for example, the support surface 162 of the landing pad 160). The motorized leg system 310 can include any number of movable support legs 173 and/or other support surface-contacting mechanisms as may be desired and/or appropriate to the application setting. Various examples of motorized leg systems are known in the art. Further elaboration in these regards is not provided here for the sake of brevity save to note that the aforementioned control circuit 306 may be configured to control the various operating states of the motorized leg system 310 to thereby control when and how the motorized leg system 310 operates.

In the exemplary embodiment of FIG. 3, the control circuit 306 operably couples to at least one wireless transceiver 312 that operates according to any known wireless protocol. This wireless transceiver 312 can comprise, for example, a cellular-compatible, Wi-Fi-compatible, and/or Bluetooth-compatible transceiver that can wirelessly communicate with the central computer system 140 via the network 150. So configured, the control circuit 306 of the UAV 370 can provide information to the central computer system 140 (via the network 150) and can receive information and/or movement instructions from the central computer system 140. For example, the control circuit 306 can receive instructions from the central computer system 140 via the network 150 regarding directional movement (e.g., specific predetermined routes of movement) of the UAV 370 when transporting a package 180 and/or when located on, or hovering over a landing pad 160. These teachings will accommodate using any of a wide variety of wireless technologies as desired and/or as may be appropriate in a given application setting. These teachings will also accommodate employing two or more different wireless transceivers 312, if desired. In some embodiments, the wireless transceiver 312 may be caused (e.g., by the control circuit 306) to transmit to the central computer system 140 at least one signal indicating that one or more packages 180 have been picked up from (or dropped off onto) the landing pad 160. In some embodiments, the wireless transceiver 312 is configured to receive at least one signal from the central computer system 140 indicating a location (e.g., another landing pad) where the package 180 picked up from the landing pad 160 is to be transported.

The control circuit 306 also couples to one or more on-board sensors 314 of the UAV 370. These teachings will accommodate a wide variety of sensor technologies and form factors. By one approach, the one board sensors 314 can comprise at least one sensor configured to recognize the landing pad 160 and at least one sensor configured to detect whether the package 180 is present on the landing pad 160. Such sensors 314 can provide information that the control circuit 306 and/or the central computer system 140 can employ to determine a present location and/or orientation of the UAV 370 relative to a landing pad 160 and/or to determine whether to direct the UAV 370 to land on the landing pad 160 (e.g., if the package 180 is detected on the landing pad 160) or whether to direct the UAV 370 not to land on the landing pad 160 (e.g., if the package 180 is not detected on the landing pad 160). For example, the UAV 170 may include an on board sensor 314 in the form of a video camera configured to detect whether the package 180 is present on a landing pad 160 or not.

In some embodiments, the on-board sensors 314 may include at least one sensor configured to detect a distance from the body of the UAV 370 to a landing pad 160 or to a package 180 positioned on the landing pad 160. For example, the control circuit 306 of the UAV 370 may be programmed to determine, based on data received from such an on-board sensor 314 indicating the distance from the housing of the UAV 370 to the landing pad 160 and/or to the package 180, when to open a cover of the receptacle of the UAV 370 in order to enable the UAV 370 to land onto the landing pad 160 and over the package 180. For example, the control circuit 306 may be programmed to open the cover 179 of the receptacle 174 of the UAV 170 when the distance from the UAV 170 to the package 180 is about 3 feet. It will be understood that the cover 179 of the receptacle 174 may be opened at any other suitable distance, e.g., when the UAV hovers 1 foot, 2 feet, 4 feet, 5 feet, or 6 feet above the package 180.

These teachings will accommodate any of a variety of distance measurement units including optical units and sound/ultrasound units. In one example, a sensor 314 comprises an altimeter and/or a laser distance sensor device capable of determining a distance to objects in proximity to the sensor. In some embodiments, the sensor 314 comprises an optical-based scanning device to sense and read optical patterns in proximity to the sensor, such as bar codes located on the landing pad 160 and/or on the product 180. In some embodiments, the sensor 314 comprises a radio frequency identification (RFID) tag reader capable of reading RFID tags in proximity to the sensor. The foregoing examples are provided by way of example only and are not intended to convey an exhaustive listing of all possible distance sensors.

In some embodiments, the on-board sensors 314 may include at least one sensor configured to detect a size of at least one package 180 on the landing pad 160. For example, the UAV 170 may include a video camera and video analytics configured to determine a size of the package 180 located on the landing pad 160 relative to the size of the body of the UAV 370. The control circuit 306 of the UAV 370 may be programmed to determine, based on data received from such an on-board sensor 314 indicating the size of the package 180 on the landing pad 160, whether to open the cover 179 of the receptacle 174 of the UAV 170 for picking up the package 180 on the landing pad 160, or to abort pick up of the package 180 on the landing pad 160. In other words, if data received by the control circuit 306 from an on-board sensor 314 indicating that the size of a package 180 on the landing pad 160 is too large for the UAV 370 to accommodate in its receptacle, the control unit 306 of the UAV 170 is programmed, in some embodiments, to direct the UAV 170 to not land onto that landing pad 160, as the control unit 306 recognizes that the UAV 170 will not be able to pick up such a product 180 from the landing pad 160.

In some embodiments, the on-board sensors 314 may include at least one sensor configured to detect a shape of at least one package 180 on the landing pad 160. For example, the UAV 170 may include a video camera and video analytics configured to determine a shape of the package 180 located on the landing pad 160. In some aspects, the control circuit 306 of the UAV 370 is programmed to determine, based on data received from such an on-board sensor 314 indicating the shape of the package 180 on the landing pad 160, whether the shape of the package 180 would permit the cover 179 of the receptacle 174 of the UAV 170 to pick up the package 180 from the landing pad 160 by sliding under the package 180. In other words, in some embodiments, if the data received by the control circuit 306 from an on-board sensor 314 is analyzed by the control circuit 306 to indicate that the shape of a package 180 on the landing pad 160 is irregular, deformable, and/or of another shape that would prevent the cover 179 from picking up the package from the landing pad 160, the control unit 306 of the UAV 170 is programmed to direct the UAV 170 to not land onto the landing pad 160.

In some embodiments, the on-board sensors 314 may include at least one sensor configured to detect a frictional coefficient of the surface of at least one package 180 on the landing pad 160. For example, the UAV 170 may include a video camera and video analytics configured to determine, alone, or via the UAV 170 transmitting a query to the database 130, a material forming the exterior surface of the package 180 located on the landing pad 160. In some aspects, the control circuit 306 of the UAV 370 is programmed to determine, based on data received from such an on-board sensor 314 indicating the surface frictional coefficient of the package 180 on the landing pad 160, whether the frictional coefficient of the surface of the package 180 would permit the cover 179 of the receptacle 174 of the UAV 170 to pick up the package 180 from the landing pad 160 by sliding under the package 180. In other words, in some embodiments, if the data received by the control circuit 306 from an on-board sensor 314 is analyzed by the control circuit 306 to indicate that the surface of the package 180 on the landing pad 160 has a frictional coefficient that would prevent the cover 179 from picking up the package from the landing pad 160, the control unit 306 of the UAV 170 is programmed to direct the UAV 170 to not land onto the landing pad 160.

In some embodiments, the actuator (e.g., a mechanical motor, electrical motor, etc.) can be set to open and/or close the cover 170 with varying degrees of force and/or speed. In some aspects, if the data received by the control circuit 306 from an on-board sensor 314 is analyzed by the control circuit 306 to indicate that the shape and/or surface frictional coefficient of a package 180 on the landing pad 160 is such that the cover 179 would be unable to pick up the package from the landing pad 160 when moved by the actuator at the default force and speed, the control unit 306 of the UAV 170 is programmed determine whether the actuator has a speed and/or force setting that would be able to cause the cover 179 to pick up the package 180 and, if so, to cause the actuator to increase the force and/or speed of movement of the cover 179 to the force and/or speed calculated by the control circuit 306 to enable the cover 179 to pick up the package 180 from the landing pad 160. If not, the control circuit 306 is programmed to direct the UAV 170 to not land onto the landing pad 160 based on an analysis that the UAV 170 would be unable to pick up the product from the landing pad 160. In some embodiments, the on-board sensors 314 may include at least one sensor configured to detect whether the package 180 is present in the interior of the receptacle of the UAV 370 when the UAV 370 is positioned as in FIG. 4C, such that at least a part of the package 180 on the landing pad 160 passes through the opening of the receptacle of the UAV 370 and into the interior of the receptacle of the UAV 370. For example, in some embodiments, the UAV 370 may include at least one on-board sensor 314 configured to transmit a signal indicating presence of the package 180 in the interior of the receptacle of the UAV 370. The control circuit 306, after receipt of such a signal, is programmed to cause the cover 179 of the receptacle 174 of the UAV 170 to move from an open position (as in FIG. 4C) to a closed position (as in FIG. 4D) to fully enclose the package 180 in the interior 176 of the receptacle 174 of the UAV 170. In some embodiments, the on-board sensors. In some embodiments, the on-board sensors 314 may include at least one sensor configured to determine available space in the interior 176 of the receptacle 174 of the UAV 170 after a package 180 is loaded into the interior 176 of the receptacle 174.

In some embodiments, the UAV 370 may include one or more on-board sensors 314 configured to detect that the cover 179 of the receptacle 174 of the UAV 170 is in the closed position and to transmit a signal indicating that the cover 179 of the receptacle 174 of the UAV 170 is in the closed position. The control circuit 306, after receipt of such a signal indicating that the cover 179 is in the closed position alone, or combined with a signal indicating that the package 180 is in the interior 176 of the receptacle 174 of the UAV 170, is programmed to cause the UAV 170 to lift up from the landing pad 160 (as shown in FIG. 4E) with the package 180 secured in the interior 476 of the receptacle 174 of the UAV 470. After the UAV 170 lifts off the landing pad 160 with a package 180 in its receptacle 174, the UAV may be guided by the central computer system 140 to the next destination set for delivery of the package 180.

In some embodiments, the UAV 370 may detect objects along its path of travel using, for example, on-board sensors 314 such as sensors mounted on the UAV 370 and/or via communications with the central computer system 140. In some embodiments, the UAV 370 may attempt to avoid obstacles, and if unable to avoid, it will notify the central computer system 140 of such a condition. In some embodiments, using on-board sensors 314 (such as distance measurement units, e.g., laser or other optical-based distance measurement sensors), the UAV 370 detects obstacles in its path, and fly around such obstacles or to stop until the obstacle is clear.

By one optional approach, an audio input 316 (such as a microphone) and/or an audio output 318 (such as a speaker) can also operably couple to the control circuit 306 of the UAV 370. So configured, the control circuit 306 can provide for a variety of audible sounds to enable the UAV 370 to communicate with a landing pad 160 or other UAVs 370. Such sounds can include any of a variety of tones and other non-verbal sounds. Such audible sounds can also include, in lieu of the foregoing or in combination therewith, pre-recorded or synthesized speech.

In the embodiment illustrated in FIG. 3, the UAV 370 includes a rechargeable power source 320 such as one or more batteries. The power provided by the rechargeable power source 320 can be made available to whichever components of the UAV 370 require electrical energy. By one approach, the UAV 370 includes a plug or other electrically conductive interface that the control circuit 306 can utilize to automatically connect to an external source of electrical energy to thereby recharge the rechargeable power source 320.

These teachings will also accommodate optionally selectively and temporarily coupling the UAV 370 to the landing pad 160. In such a case, the UAV 370 can include a landing pad coupling structure 322. By one approach such a landing pad coupling structure 322 operably couples to a control circuit 306 to thereby permit the latter to control movement of the UAV 370 (e.g., via hovering and/or via the motorized leg system 310) towards a particular landing pad 160 until the landing pad coupling structure 322 can engage the landing pad 160 to thereby temporarily physically couple the UAV 370 to the landing pad 160. So coupled, the UAV 370 can then pick up and/or drop off the package 180 from and/or onto the landing pad 160.

In some embodiments, the motorized transport unit 360 includes an input/output (I/O) device 324 that is coupled to the control circuit 306. The I/O device 324 allows an external device to couple to the control unit 304. The function and purpose of connecting devices will depend on the application. In some examples, devices connecting to the I/O device 324 may add functionality to the control unit 304, allow the exporting of data from the control unit 304, allow the diagnosing of the UAV 370, and so on.

In some embodiments, the UAV 370 includes a user interface 326 including for example, user inputs and/or user outputs or displays depending on the intended interaction with the user (e.g., worker at a product distribution facility and/or a delivery driver and/or a customer). For example, user inputs could include any input device such as buttons, knobs, switches, touch sensitive surfaces or display screens, and so on. Example user outputs include lights, display screens, and so on. The user interface 326 may work together with or separate from any user interface implemented at an optional user interface unit (such as a smart phone or tablet device) usable by a worker at a product distribution facility.

In some embodiments, the UAV 370 may be controlled by a user in direct proximity to the UAV 370 (e.g., delivery driver) or by a user at any location remote to the location of the UAV 370 (e.g., central hub operator). This is due to the architecture of some embodiments where the central computer system 140 outputs the control signals to the UAV 370. These controls signals can originate at any electronic device in communication with the central computer system 140. For example, the movement signals sent to the UAV 370 may be movement instructions determined by the central computer system 140 and/or initially transmitted by a device of a user to the central computer system 140 and in turn transmitted from the central computer system 140 to the UAV 370.

The control unit 304 of the UAV 370 includes a memory 308 coupled to a control circuit 306 and storing data such as operating instructions and/or other data. The control circuit 306 can comprise a fixed-purpose hard-wired platform or can comprise a partially or wholly programmable platform. These architectural options are well known and understood in the art and require no further description. This control circuit 306 is configured (e.g., by using corresponding programming stored in the memory 308 as will be well understood by those skilled in the art) to carry out one or more of the steps, actions, and/or functions described herein. The memory 308 may be integral to the control circuit 306 or can be physically discrete (in whole or in part) from the control circuit 306 as desired. This memory 308 can also be local with respect to the control circuit 306 (where, for example, both share a common circuit board, chassis, power supply, and/or housing) or can be partially or wholly remote with respect to the control circuit 306. This memory 308 can serve, for example, to non-transitorily store the computer instructions that, when executed by the control circuit 306, cause the control circuit 306 to behave as described herein.

It is noted that not all components illustrated in FIG. 3 are included in all embodiments of the UAV 370. That is, some components may be optional depending on the implementation.

Figure 4A:
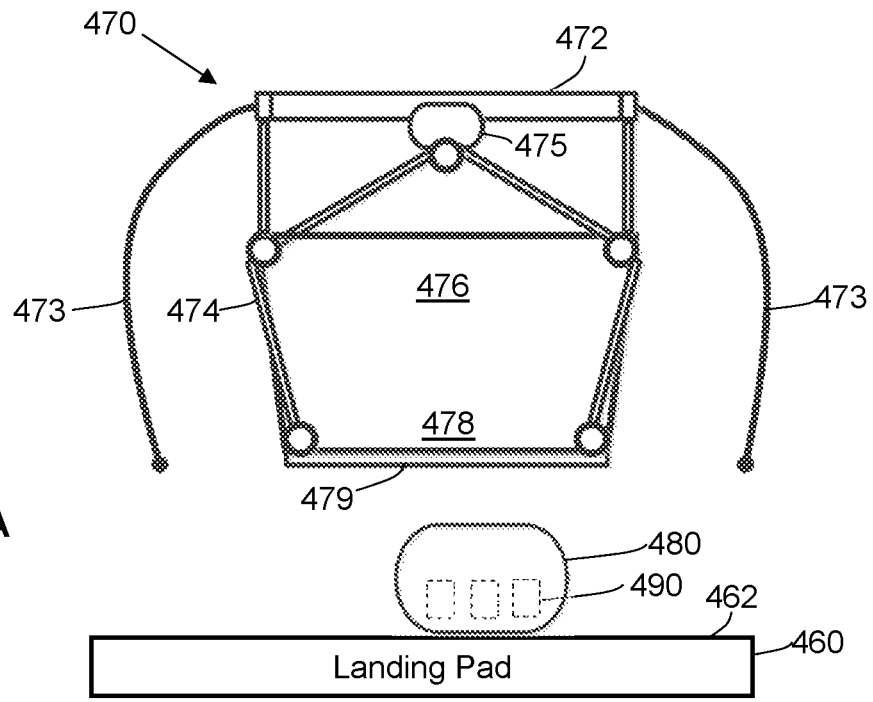
FIG. 4A is an illustration of the UAV of the system of FIG. 1 while hovering over a package positioned on a landing pad and with the sliding door in a closed position in accordance with some embodiments.

FIG. 4A illustrates a UAV 470 and a landing pad 460 according to some embodiments. As can be seen in FIG. 4A, the landing pad 460 is configured to support a package 480 including one or more products 190. As mentioned above, the package 480 may be positioned at or near the center of the landing pad 460 to facilitate the positioning of the UAV 470 relative to the landing pad 160.

Figure 4B:
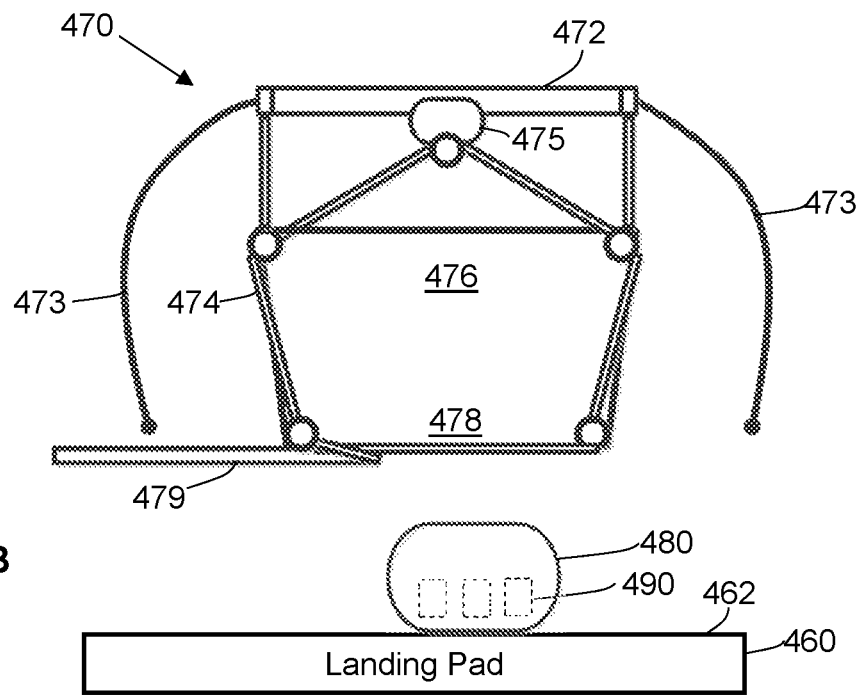
FIG. 4B is an illustration of the UAV of FIG. 4A while hovering over a package positioned on a landing pad and with the sliding door in an open position in accordance with some embodiments.

As described above, the UAV 470 includes one or more on-board sensors configured to recognize the landing pad 460, detect whether the package 480 is present on the landing pad 460, detect the size of the package 480 on the landing pad 460, and/or detect the distance from the UAV 470 to the package 480 and/or the landing pad 460 when the UAV 470 is hovering over the landing pad 460 as shown in FIG. 4A. It will be appreciated that the on-board sensor or sensors of the UAV 470 may recognize the landing pad 460, whether the package 480 is present on the landing pad 460, and detect the size of the package 480 in some embodiments even when the UAV 470 is not hovering directly over the landing pad 460. In the embodiment shown in FIG. 4A, upon a determination based on on-board sensor data that the package 480 is present on the landing pad 460, that the size of the package 480 is such that the UAV 470 is capable of picking up this package 480 and retaining the package 480 in the available space of its receptacle 474, and that the distance between the UAV 470 and the package 480 is appropriate for opening the cover 479 of the receptacle 474 of the UAV 470, the cover 479 may be opened while the UAV 470 is hovering over the landing pad 460 to expose the opening 478 of the receptacle 474, as shown in FIG. 4B. Conversely, if one or more of the above conditions detected responsive to the on-board sensor data is not met (e.g., the size of the package 180 is too large for the receptacle 474 of the UAV 470), the control circuitry of the UAV 470 may direct the UAV 470 not to open the cover 479 and not to land on the landing pad 460.

In some embodiments, in order to open the cover 479 of the receptacle 474, the UAV 470 includes an actuator 482 coupled to the cover 479 and/or to the receptacle 474. The actuator 482 may include but is not limited to a mechanical motor, an electric motor, or the like. In one approach, the actuator 482 is configured to move the cover 479 between a second (open) position shown in FIG. 4B and a first (closed) position shown in FIG. 4D. In some embodiments, the actuator 482 is configured to move the cover 479 from the second (open) position to the first (closed) position by forcing the cover 479 to slide (in the direction indicated by the directional arrow in FIG. 4C) under the package 480 located on the support surface 462 of the landing pad 460 and positioned partially in the interior 476 of the receptacle 474 and partially in the opening 478 of the receptacle 474. In other words, as the cover 479 moves from the position shown in FIG. 4C to the position shown in FIG. 4D, the cover 479 moves between the support surface and the bottom of the package 480 to scoop up the package 480 from the support surface 462 of the landing pad 460. As such, after the cover 479 is moved (e.g., by the actuator 482) from the second (open) position of FIG. 4C into the first (closed) position of FIG. 4D, the product 480 is fully enclosed in the interior 476 of the receptacle 474 of the UAV 470 and is supported on the interior-facing surface of the cover 479, as shown in FIG. 4D. Notably, the product 480 is shown to be slightly spaced from the interior-facing surface of the cover 479 for clarity of illustration only.

Figure 4C:
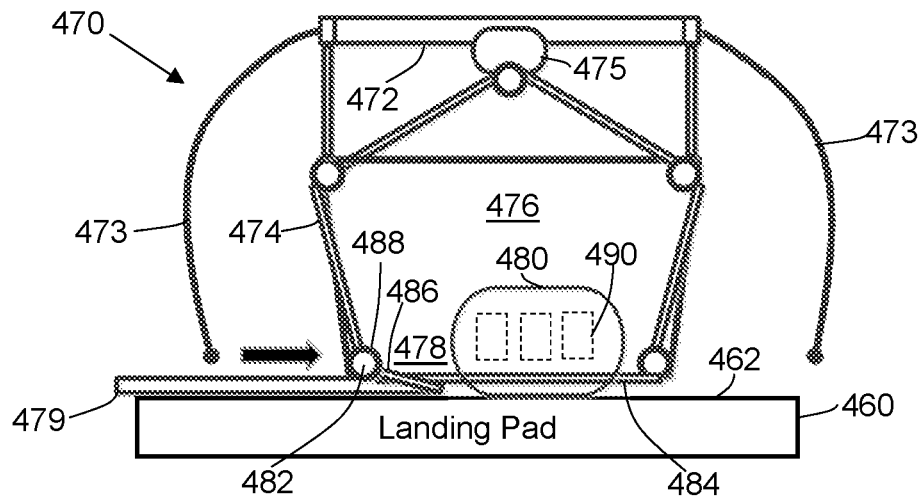
FIG. 4C is an illustration of the UAV of FIG. 4B after landing over the package onto the landing pad and receiving a portion of the package into the interior of the UAV with the sliding door being in an open position in accordance with some embodiments.
Figure 4D:
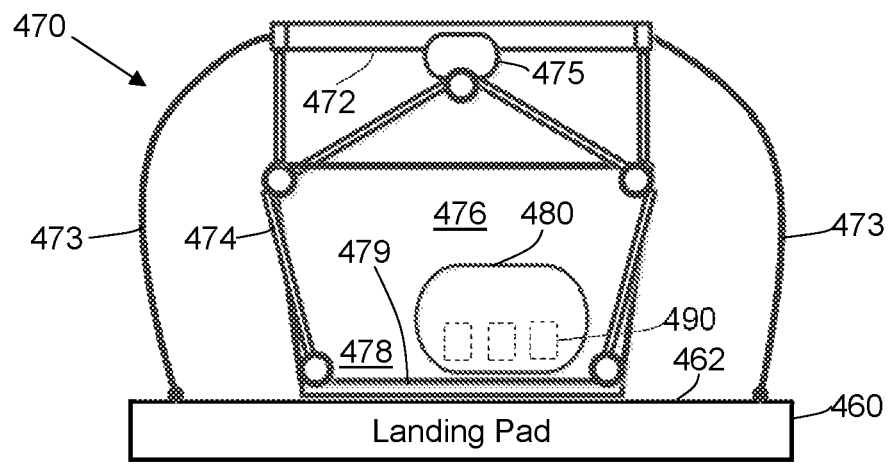
FIG. 4D is an illustration of the UAV of FIG. 4C after the UAV landed onto the landing pad over the product and after the sliding door of the UAV has been moved into a closed position to enclose the package in the interior of the UAV in accordance with some embodiments.
Figure 4E:
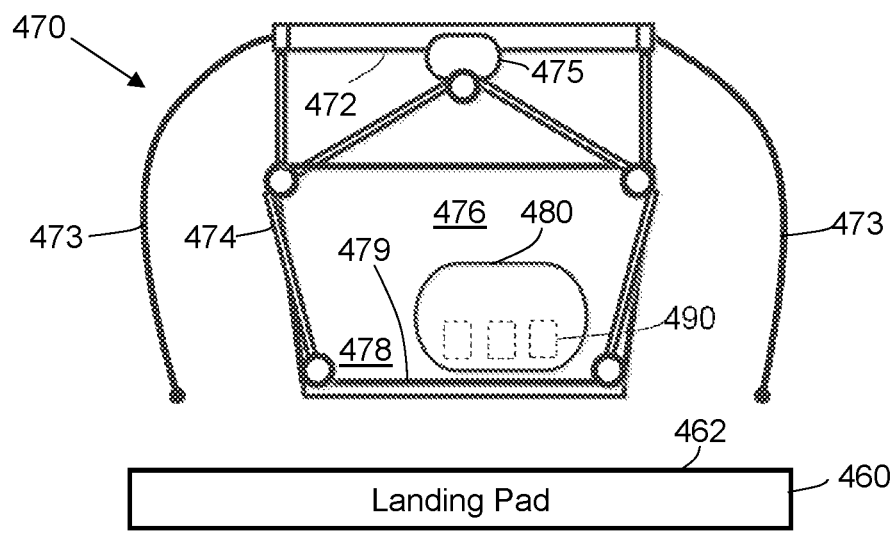
FIG. 4E is an illustration of the UAV of FIG. 4D after the UAV takes off the landing pad with the product enclosed in the interior of the UAV in accordance with some embodiments.

It will be appreciated that instead of the cover 479 sliding under the package 480 and in between the package 480 and the support surface 462 and the bottom of the package 480 to effectively act as a scooping device that picks up the package 480 off the support surface 462 of the landing pad 460, it will be appreciated that in some embodiments, the cover 479 of the UAV 470 may remain open as in FIG. 4C and another device coupled to the body 472 and/or the receptacle 474 of the UAV 470 may be retracted from the UAV 470 to scoop up and or otherwise lift (e.g., via a hook-based, clip-based, magnet-based, or any other suitable coupling) the package off the support surface 462 and into the interior 476 of the receptacle 474 of the UAV 470, after which the cover 479 of the receptacle 474 of the UAV 470 may be closed as in FIG. 4D (but without having to scoop the package 480), and the UAV 470 can take off the landing pad 460 with the package 480 fully enclosed in the interior 476 of the receptacle 474 of the UAV 470.

In some embodiments, with the package 480 being supported on the cover 479 and fully enclosed in the interior 476 of the receptacle 474 of the UAV 470 as shown in FIG. 4D, the presence of the product 480 in the interior 476 of the receptacle 474 of the UAV 470 may be detected by an on-board sensor of the UAV 470 and communicated to the control circuit of the UAV 470 and/or to the central computer system 140, after which the UAV 470 is instructed (e.g., by the control circuit of the UAV 470 and/or by the central computer system 140) to lift off the support surface 462 of the landing pad 460 (as shown in FIG. 4E) and to transport the package 480 from the landing pad 460 to the next intended destination of the package 480. In some embodiments, the control unit of the UAV 470 may receive new destination instructions transmitted from the central computer system 140 via the network 150.

Figure 5:
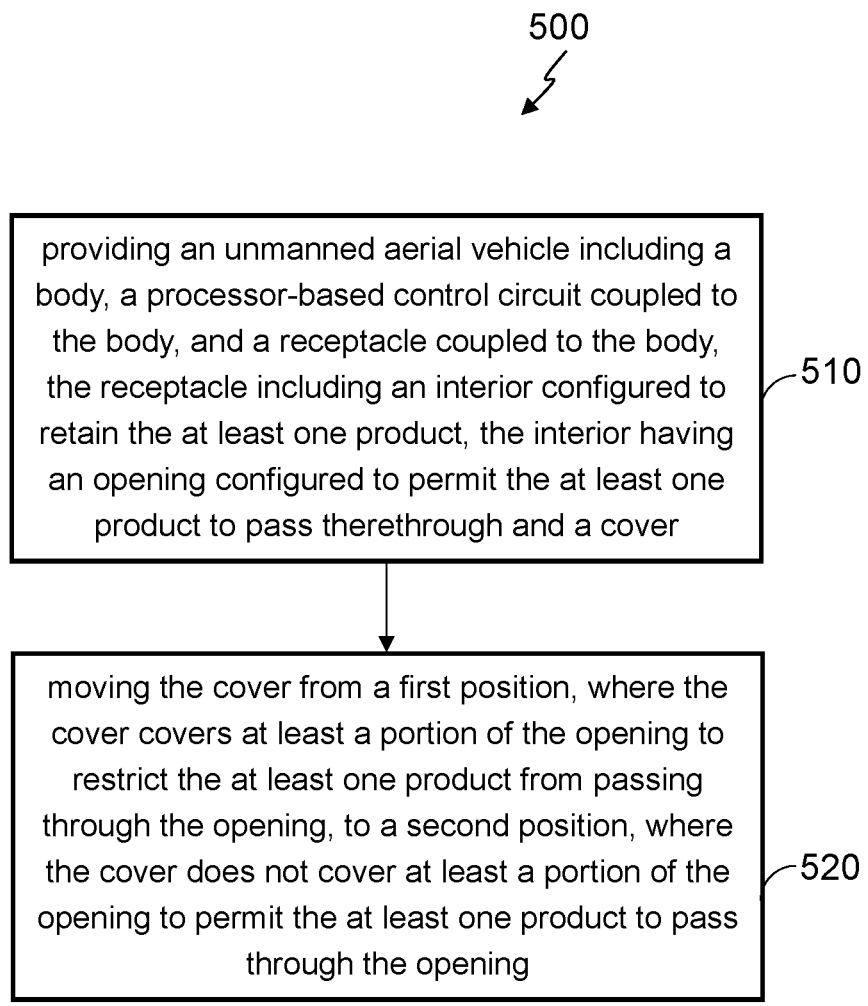
FIG. 5 is a flow diagram of a method of transporting product-containing packages via unmanned aerial vehicles in accordance with some embodiments.

In view of the above description referring to FIGS. 4A-4E, and with reference to FIG. 5, a method of transporting at least one product 190 via an unmanned aerial system 100 is now described. While the process 500 is discussed as it applies to the transportation of the packages 180 and 480 of FIGS. 1 and 4A, respectively, it will be appreciated that the process 500 may be utilized in connection with any of the embodiments described herein. Step 510 of the exemplary method 500 includes providing a UAV 170 including a body 172, a processor-based control circuit 306 coupled to the body 172, and a receptacle 174 coupled to the body 172. As described above with reference to FIG. 1, the receptacle 174 includes a cover 179 and an interior 176 configured to retain one or more packages 180 and/or products 190 and has an opening 178 configured to permit one or more packages 180 and/or products 190 to pass therethrough. Step 520 of the exemplary method 500 includes moving the cover 479 from a first (closed) position, where the cover 479 covers at least a portion of the opening 478 to restrict the package 480 and/or product 490 from passing through the opening 478, to a second (open) position, where the cover 479 does not cover at least a portion of the opening 478 to permit one or more packages 480 and/or products 490 to pass through the opening 478 of the receptacle 474 of the UAV 470 (see, e.g., FIGS. 4C and 4D).

In After the UAV 470 arrives at the next destination, e.g., another landing pad 460, the UAV can land onto that landing pad 460 and drop off the package 480 by way of opening the cover 479 of the receptacle 474 (e.g., via an actuator 482) after landing onto the support surface 462 of the landing pad 460. In other words, since the product 480 is fully enclosed in the interior 476 of the receptacle 474 of the UAV 470 and is supported on the interior-facing surface of the cover 479 as shown in FIG. 4E while being transported from one landing pad 460 to another 460, the movement of the cover 479 from the closed position (of FIG. 4D) to the open position (of FIG. 4C) would release the product 480 from the interior 476 of the receptacle 474 of the UAV 470 such that the product 480 would now be supported on the support surface 462 of the landing pad substantially as shown in FIG. 4C.

After the product 480 is released from the interior 476 of the receptacle 474 of the UAV 470, the UAV 470 is then instructed (e.g., by the control circuit of the UAV 470 and/or by the central computer system 140) to lift off the support surface 462 of the landing pad 460 (as shown in FIG. 4E, but without the package 480 in the receptacle 474 of the UAV 470), leaving the product on the support surface 462 of the landing pad 460. After the UAV 470 lifts off the landing pad 460, the UAV 470 is then instructed (e.g., by the control circuit of the UAV 470 and/or by the central computer system 140) to move the cover 479 of the receptacle 474 (e.g., via the actuator 482) from the open position to the closed position in order to enable the UAV 470 to fly with its receptacle 474 closed to the next destination as directed by the central computer system 140 via the network 150 or as directed by another operator of the UAV 470. Notably, after the UAV 470 drops off the package 480 on the support surface 462 of the landing pad 460 and takes off the landing pad 460, a consumer may safely retrieve the package 480 from the landing pad 460 without being exposed to the moving propellers of the UAV 470, which is clearly safer for the consumer.

In some embodiments, to effectuate the movement of the cover 479 of the receptacle 474 of the UAV 470 between the first (closed) position and the second (open) position, the UAV 470 includes a track 484 configured to permit movement of the cover 479 thereon and a cable 486 coupled to the actuator 482 and the cover 479 as shown in FIG. 4C. It will be appreciated that the track 484 is shown in FIG. 4C by way of example only, and that any other structural arrangement (e.g., guide rods, etc.) suitable to provide for reciprocating movement of the cover 479 of the receptacle 474 of the UAV 470 may be used instead. The actuator 482, the track 484 and the cable 486 of the exemplary UAV 470 shown in FIG. 4C combine together to enable movement of the cover 479 of the receptacle 474 between the second (open) position of FIG. 4C and the first (closed) position of FIG. 4D. In some embodiments, the UAV 470 includes one or more pulleys 488 (see, e.g., FIG. 4C) coupled to the body 472 and/or the receptacle 474 and configured to be operatively coupled to one or more cables which are in turned coupled to an actuator such as a mechanical or electrical motor to enable movement of the cover 479 between the first and second positions. In some embodiments, an actuator such as a mechanical or electrical motor may be a coupled to an automatic motor track system enabling the cover 479 to travel back and forth along the automatic motor track system without the cable 486 and/or the pulley 488.

The systems and methods described herein advantageously provide for semi-automated or fully automated operation of unmanned aerial vehicles to transport product containing packages between retailer facilities and/or to consumers. The UAVs are configured to pick up, transport, and drop off one or more packages including one or more products without requiring manual loading or unloading of the UAVs by an operator (e.g., delivery driver) or by the customer by utilizing a network of landing pads that permit UAVs to land thereon and/or couple thereto for package pick up and/or drop off. As such, the efficiency of package delivery to consumers and the costs of transporting packages are significantly increased.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An unmanned aerial system for transporting at least one product, the system comprising:
    an unmanned aerial vehicle including a body, a processor-based control circuit coupled to the body, and a receptacle coupled to the body, the receptacle including:
        an interior configured to retain the at least one product, the interior having an opening configured to permit the at least one product to pass therethrough;
        a cover movable from a first position, where the cover covers at least a portion of the opening to restrict the at least one product from passing through the opening, to a second position, where the cover does not cover at least a portion of the opening to permit the at least one product to pass through the opening; and
        an actuator coupled to the cover, the actuator configured to move the cover from the second position to the first position by forcing the cover to slide under the at least one product positioned partially in the interior of the receptacle and partially in the opening of the interior, and wherein the at least one product is supported on the cover and fully enclosed in the interior of the receptacle when the cover is in the first position.

2. The system of claim 1, wherein the unmanned aerial vehicle further comprises at least one of: a track configured to permit movement of the cover thereon; a cable coupled to the actuator and the cover and configured to move the cover between the first and second positions; and at least one pulley coupled to at least one of the body and the receptacle and configured to be operatively coupled to at least one cable configured to move the cover between the first and second positions.

3. The system of claim 1, wherein the unmanned aerial vehicle further comprises a plurality of support legs extending from the body, and wherein the receptacle is made from a material extending around the support legs or a material located between the support legs.

4. The system of claim 1, further comprising a landing pad configured to support the at least one product thereon, the unmanned aerial vehicle further including at least one first sensor configured to recognize the landing pad and at least one second sensor configured to detect whether the at least one product is present on the landing pad.

5. The system of claim 4, wherein the unmanned aerial vehicle further includes at least one third sensor configured to detect a distance from the body of the unmanned aerial vehicle to at least one of the landing pad and the at least one product on the landing pad, the control circuit being programmed to determine, based on data indicating the distance from the body of the unmanned aerial vehicle to at least one of the landing pad and the at least one product on the landing pad received from the at least one third sensor, when to open the cover of the receptacle.

6. The system of claim 4, further comprising a central computer system in communication with the control circuit of the unmanned aerial vehicle, wherein the unmanned aerial vehicle is configured to transmit to the central computer system at least one signal indicating that the at least one product has been picked up from the landing pad, and wherein the central computer system is configured to transmit at least one signal to the unmanned aerial vehicle indicating a location where the at least one product picked up from the landing pad is to be transported.

7. An unmanned aerial system for transporting at least one product, the system comprising:
    an unmanned aerial vehicle including a body, a processor-based control circuit coupled to the body, and a receptacle coupled to the body, the receptacle including:
        an interior configured to retain the at least one product, the interior having an opening configured to permit the at least one product to pass therethrough;
        a cover movable from a first position, where the cover covers at least a portion of the opening to restrict the at least one product from passing through the opening, to a second position, where the cover does not cover at least a portion of the opening to permit the at least one product to pass through the opening; and
    a landing pad configured to support the at least one product thereon, the unmanned aerial vehicle further including at least one first sensor configured to recognize the landing pad and at least one second sensor configured to detect whether the at least one product is present on the landing pad;

wherein the unmanned aerial vehicle includes at least one third sensor configured to detect a size of the at least one product on the landing pad, the control circuit being programmed to determine, based on data indicating the size of the at least one product on the landing pad received from the at least one third sensor, whether to open the cover of the receptacle for picking up the at least one product on the landing pad, or to abort pick up of the at least one product on the landing pad.

8. An unmanned aerial system for transporting at least one product, the system comprising:

an unmanned aerial vehicle including a body, a processor-based control circuit coupled to the body, and a receptacle coupled to the body, the receptacle including:

an interior configured to retain the at least one product, the interior having an opening configured to permit the at least one product to pass therethrough;

a cover movable from a first position, where the cover covers at least a portion of the opening to restrict the at least one product from passing through the opening, to a second position, where the cover does not cover at least a portion of the opening to permit the at least one product to pass through the opening; and a landing pad configured to support the at least one product thereon, the unmanned aerial vehicle further including at least one first sensor configured to recognize the landing pad and at least one second sensor configured to detect whether the at least one product is present on the landing pad;

wherein the unmanned aerial vehicle includes at least one third sensor configured to detect whether the at least one product is present in the interior of the receptacle when the unmanned aerial vehicle is positioned such that at least a part of the at least one product on the landing pad passes through the opening of the receptacle into the interior of the receptacle.

9. The system of claim 8, wherein the at least one third sensor is configured to transmit a signal indicating a presence of the at least one product in the interior of the receptacle, and the control circuit, after receipt of the signal, is programmed to cause the cover move from the second position to the first position to fully enclose the at least one product in the interior of the receptacle when the cover is in the first position, and further comprising at least one fourth sensor configured to detect that the cover is in the first position and to transmit a signal indicating that the cover is in the first position, and the control circuit, after receipt of the signal indicating that the cover is in the first position, is programmed to cause the unmanned aerial vehicle to lift up from the landing pad.

10. A method of transporting at least one product via an unmanned aerial system, the method comprising:

providing an unmanned aerial vehicle including a body, a processor-based control circuit coupled to the body, and a receptacle coupled to the body, the receptacle including an interior configured to retain the at least one product, the interior having an opening configured to permit the at least one product to pass therethrough and a cover;

moving the cover from a first position, where the cover covers at least a portion of the opening to restrict the at least one product from passing through the opening, to a second position, where the cover does not cover at least a portion of the opening to permit the at least one product to pass through the opening; and providing an actuator coupled to the cover and moving the cover, via the actuator, from the second position to the first position by forcing the cover to slide under the at least one product positioned partially in the interior of the receptacle and partially in the opening of the interior, and further comprising supporting the at least one product on the cover and fully enclosing the at least one product in the interior of the receptacle when the cover is in the first position.

11. The method of claim 10, further comprising providing the unmanned aerial vehicle with at least one of: a track configured to permit movement of the cover thereon; a cable coupled to the actuator and the cover and configured to move the cover between the first and second positions; and at least one pulley coupled to at least one of the body and the receptacle and configured to be operatively coupled to at least one cable configured to move the cover between the first and second positions.

12. The method of claim 10, further comprising providing the unmanned aerial vehicle with a plurality of support legs extending from the body, wherein the receptacle is made from a material extending around the support legs or a material located between the support legs.

13. The method of claim 10, further comprising providing a landing pad configured to support the at least one product thereon, and further comprising providing the unmanned aerial vehicle with at least one first sensor configured to recognize the landing pad and at least one second sensor configured to detect whether the at least one product is present on the landing pad.

14. The method of claim 13, further comprising detecting, via at least one third sensor coupled to the unmanned aerial vehicle, a distance from the body of the unmanned aerial vehicle to at least one of the landing pad and the at least one product on the landing pad, and determining, via the control circuit and based on data received from the at least one third sensor and indicating the distance from the body of the unmanned aerial vehicle to at least one of the landing pad and the at least one product on the landing pad, when to open the cover of the receptacle.

15. The method of claim 14, further comprising transmitting a signal indicating presence of the at least one product in the interior of the receptacle via the at least one third sensor, and causing, via the control circuit and after receipt of the signal, the cover to move from the second position to the first position to fully enclose the at least one product in the interior of the receptacle when the cover is in the first position, and further comprising transmitting, via at least one fourth sensor configured to detect that the cover is in the first position, a signal indicating that the cover is in the first position, and causing, via the control circuit and after receipt of the signal from the indicating that the cover is in the first position, the unmanned aerial vehicle to lift up from landing pad.

16. The method of claim 13, further comprising:

providing a central computer system in communication with the control circuit of the unmanned aerial vehicle;

transmitting, from the unmanned aerial vehicle to the central computer system, at least one signal indicating that the at least one product has been picked up from the landing pad; and transmitting, from the central computer system to the unmanned aerial vehicle, at least one signal indicating a location where the at least one product picked up from the landing pad is to be transported.

17. A method of transporting at least one product via an unmanned aerial system, the method comprising:

providing an unmanned aerial vehicle including a body, a processor-based control circuit coupled to the body, and a receptacle coupled to the body, the receptacle including an interior configured to retain the at least one product, the interior having an opening configured to permit the at least one product to pass therethrough and a cover;

moving the cover from a first position, where the cover covers at least a portion of the opening to restrict the at least one product from passing through the opening, to a second position, where the cover does not cover at least a portion of the opening to permit the at least one product to pass through the opening;

providing a landing pad configured to support the at least one product thereon, and further comprising providing the unmanned aerial vehicle with at least one first sensor configured to recognize the landing pad and at least one second sensor configured to detect whether the at least one product is present on the landing pad; and detecting, via at least one third sensor coupled to the unmanned aerial vehicle, a size of the at least one product on the landing pad, and determining, via the control circuit and based on data received from the at least one third sensor and indicating the size of the at least one product on the landing pad, whether to open the cover of the receptacle for picking up the at least one product on the landing pad, or to abort pick up of the at least one product on the landing pad.

18. A method of transporting at least one product via an unmanned aerial system, the method comprising:

providing an unmanned aerial vehicle including a body, a processor-based control circuit coupled to the body, and a receptacle coupled to the body, the receptacle including an interior configured to retain the at least one product, the interior having an opening configured to permit the at least one product to pass therethrough and a cover;

moving the cover from a first position, where the cover covers at least a portion of the opening to restrict the at least one product from passing through the opening, to a second position, where the cover does not cover at least a portion of the opening to permit the at least one product to pass through the opening;

providing a landing pad configured to support the at least one product thereon, and further comprising providing the unmanned aerial vehicle with at least one sensor configured to recognize the landing pad and at least one second sensor configured to detect whether the at least one product is present on the landing pad; and positioning the unmanned aerial vehicle such that at least a part of the at least one product on the landing pad passes through the opening of the receptacle into the interior of the receptacle, and detecting, via at least one third sensor coupled to the unmanned aerial vehicle, whether the at least one product is present in the interior of the receptacle.

* * * * *